US012691645B2

(12) United States Patent
Kitazawa et al.

(10) Patent No.: US 12,691,645 B2
(45) Date of Patent: Jul. 28, 2026

(54) COMPOSITE MATERIAL MOLDING METHOD

(71) Applicant: MITSUBISHI HEAVY INDUSTRIES, LTD., Tokyo (JP)

(72) Inventors: Toshiki Kitazawa, Tokyo (JP); Masahiko Shimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 97 days.

(21) Appl. No.: 18/016,479

(22) PCT Filed: Mar. 10, 2021

(86) PCT No.: PCT/JP2021/009602
§ 371 (c)(1),
(2) Date: Jan. 17, 2023

(87) PCT Pub. No.: WO2022/190282
PCT Pub. Date: Sep. 15, 2022

(65) Prior Publication Data
US 2023/0294371 A1 Sep. 21, 2023

(51) Int. Cl.
*B29C 70/34* (2006.01)
*B29C 70/44* (2006.01)

(52) U.S. Cl.
CPC .......... *B29C 70/345* (2013.01); *B29C 70/443* (2013.01)

(58) Field of Classification Search
CPC ......... B29C 33/20; B29C 33/40; B29C 33/76; B29C 65/70
See application file for complete search history.

(56) References Cited

U.S. PATENT DOCUMENTS 6,485,668 B1 * 11/2002 Murphy .................. B29C 70/44
425/389
12,070,914 B2 * 8/2024 Shimono ................. B29C 43/36
(Continued)

FOREIGN PATENT DOCUMENTS

| | | |
|---|---|---|
| JP | H02175135 A | 7/1990 |
| JP | 2013154494 A | 8/2013 |
| JP | 6563284 B2 | 8/2019 |

OTHER PUBLICATIONS

International Search Report of International Application No. PCT/JP2021/009602 mailed May 25, 2021; 5pp.

*Primary Examiner* — Alison L Hindenlang
*Assistant Examiner* — Debjani Roy
(74) *Attorney, Agent, or Firm* — HAUPTMAN HAM, LLP

(57) ABSTRACT

A composite material molding method for molding a composite material by integrating a first fiber base material which is formed in a plate shape and a second fiber base material. The method includes installing, in a recess in a first molding surface of a molding tool, the second fiber base material formed in a shape corresponding to the recess; fixing a first fiber-reinforced portion which is a part of a plurality of fiber reinforced sheets included in the first fiber base material to the first molding surface to cover the recess in which the second fiber base material is installed by the installation step; laying up a second fiber-reinforced portion on the first fiber-reinforced portion fixed by the fixing step; and molding the composite material by integrating and curing the first fiber base material and the second fiber base material installed in the recess using a resin material.

7 Claims, 13 Drawing Sheets

(56)          References Cited

U.S. PATENT DOCUMENTS

| 2015/0064410 A1* | 3/2015 | Fitchett | ................... B29C 70/44 |
| | | | 264/261 |
| 2017/0252982 A1* | 9/2017 | Knutson | ............... B29C 70/021 |
| 2018/0297300 A1 | 10/2018 | Tokutomi et al. | |

* cited by examiner

COMPOSITE MATERIAL MOLDING METHOD

RELATED APPLICATIONS

The present application is a National Phase of International Application Number PCT/JP2021/009602 filed Mar. 10, 2021.

TECHNICAL FIELD

The present disclosure relates to a composite material molding method.

BACKGROUND ART

In the related art, as a method for molding a composite material used as a structural material for an aircraft or the like, a method is known in which a laminate (charge) in which fiber reinforced sheets are laminated is placed on a molding tool of an outer mold line, and a plurality of composite material components are installed on the laminate and integrally molded (for example, refer to PTL 1).

In PTL 1, a skin is installed in a skin mold, a stringer is installed on the skin, the stringer is pressed by a stringer mold, and the stringer mold is sealed by a folding plate to form a closed space. In addition, a resin material is injected into the closed space to impregnate a fiber base material forming the skin and the stringer with the resin material. By heating and curing the resin material with which the fiber base material is impregnated, a molded product in which the stringer and the skin are integrated is completed.

CITATION LIST

Patent Literature

PTL 1: Japanese Patent No. 6563284

SUMMARY OF INVENTION

Technical Problem

However, in the molding method disclosed in PTL 1, it is necessary to perform accurate positioning when the stringer is installed on the skin and to attach the stringer mold while maintaining a position of the positioned stringer, and high work accuracy is required. In addition, the work of sealing the stringer mold with the folding plate is complicated, and man-hours of work increase.

In order to solve the above problems, a method of using a molding tool of an inner mold line can be considered. In a case of the molding tool of the inner mold line, since a recess for accommodating the composite material component is formed in the molding tool, there is an advantage that high work accuracy is not required when positioning the composite material component. In addition, since the laminate is installed to cover the composite material component, the man-hours of work for sealing the laminate and the composite material component to form a closed space are reduced.

However, when the laminate is installed in the molding tool, the laminate may come into contact with the composite material component accommodated in the recess, so that the composite material component may move or the composite material component may be wrinkled. In addition, in a case where a subsidiary material such as a release film is disposed between the molding tool and the laminate, the laminate may come into contact with the subsidiary material so that the subsidiary material may move, or the subsidiary material may get caught between the composite material component and the laminate.

The present disclosure has been made in view of such circumstances, and an object thereof is to provide a composite material molding method that, when a composite material is molded by integrating a first fiber base material which is formed in a plate shape and a second fiber base material, can prevent positional deviation of the second fiber base material with respect to the first fiber base material and occurrence of wrinkles in the second fiber base material.

Solution to Problem

The composite material molding method according to one aspect of the present disclosure is a composite material molding method for molding a composite material by integrating a first fiber base material which is formed in a plate shape and a second fiber base material, the method including: an installation step of installing, in a recess formed in a first molding surface of a molding tool having the first molding surface extending along a first direction, the second fiber base material formed in a shape corresponding to the recess; a fixing step of fixing a first fiber-reinforced portion which is a part of a plurality of fiber reinforced sheets included in the first fiber base material to the first molding surface to cover the recess in which the second fiber base material is installed by the installation step; a lay-up step of laying up a second fiber-reinforced portion, which is the other part of the plurality of fiber reinforced sheets included in the first fiber base material, on the first fiber-reinforced portion fixed by the fixing step; and a molding step of molding the composite material by integrating and curing the first fiber base material and the second fiber base material installed in the recess using resin material.

Advantageous Effects of Invention

According to the present disclosure, it is possible to provide a composite material molding method capable of preventing, when a composite material is molded by integrating a first fiber base material formed in a plate shape and a second fiber base material, positional deviation of the second fiber base material with respect to the first fiber base material.

BRIEF DESCRIPTION OF DRAWINGS

FIG. 7 is a cross-sectional view showing a state in which a first fiber-reinforced portion is fixed to the molding tool shown in FIG. 6.

FIG. 8 is a cross-sectional view showing a state in which a second fiber-reinforced portion is laid up on the molding tool shown in FIG. 7.

FIG. 12 is a cross-sectional view showing a state in which the second fiber-reinforced portion is laid up on the first fiber-reinforced portion shown in FIG. 10.

DESCRIPTION OF EMBODIMENTS

First Embodiment

Figure 1:
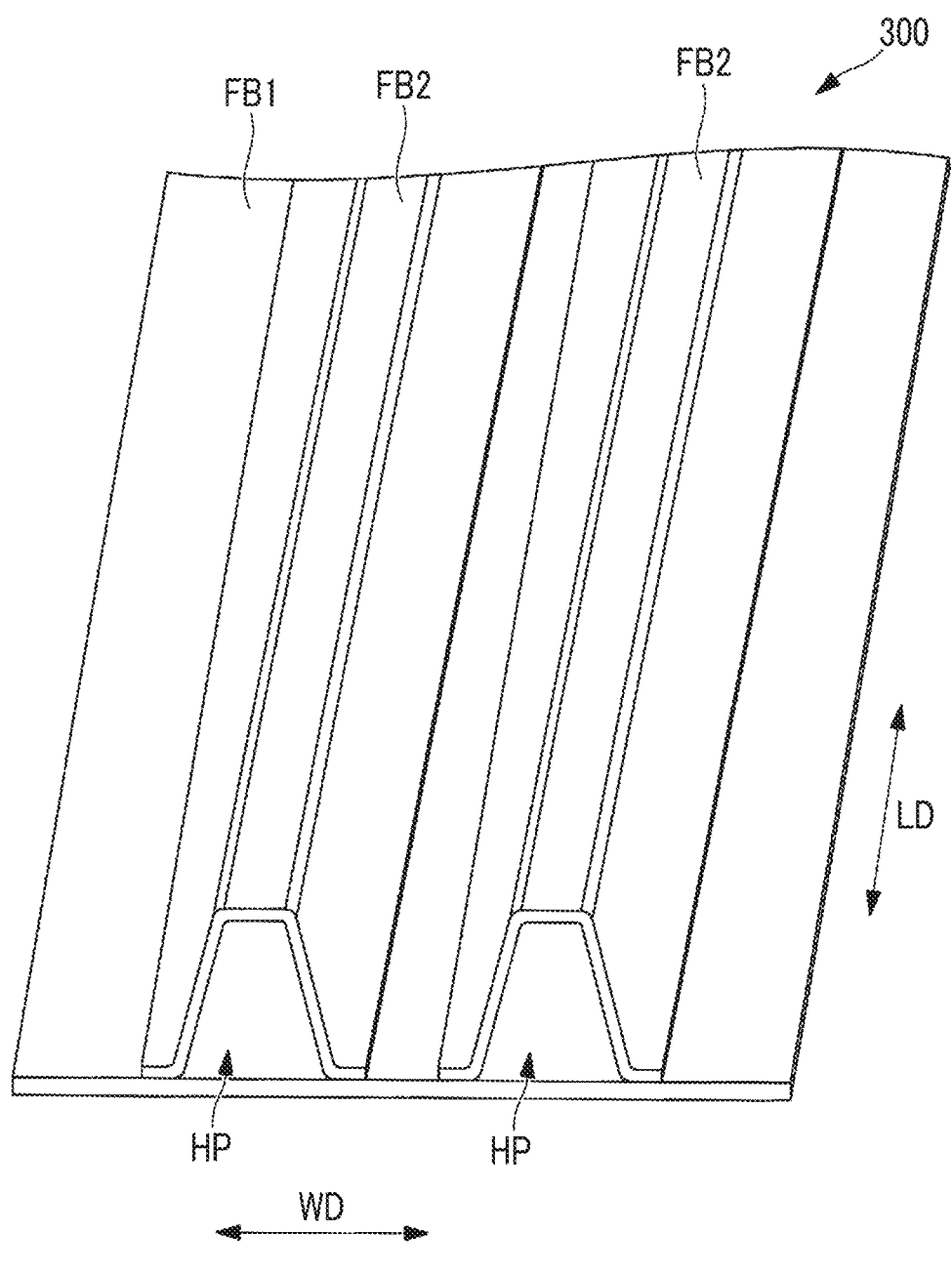
FIG. 1 is a perspective view showing a composite material molded by a composite material molding method according to a first embodiment of the present disclosure.
Figure 2:
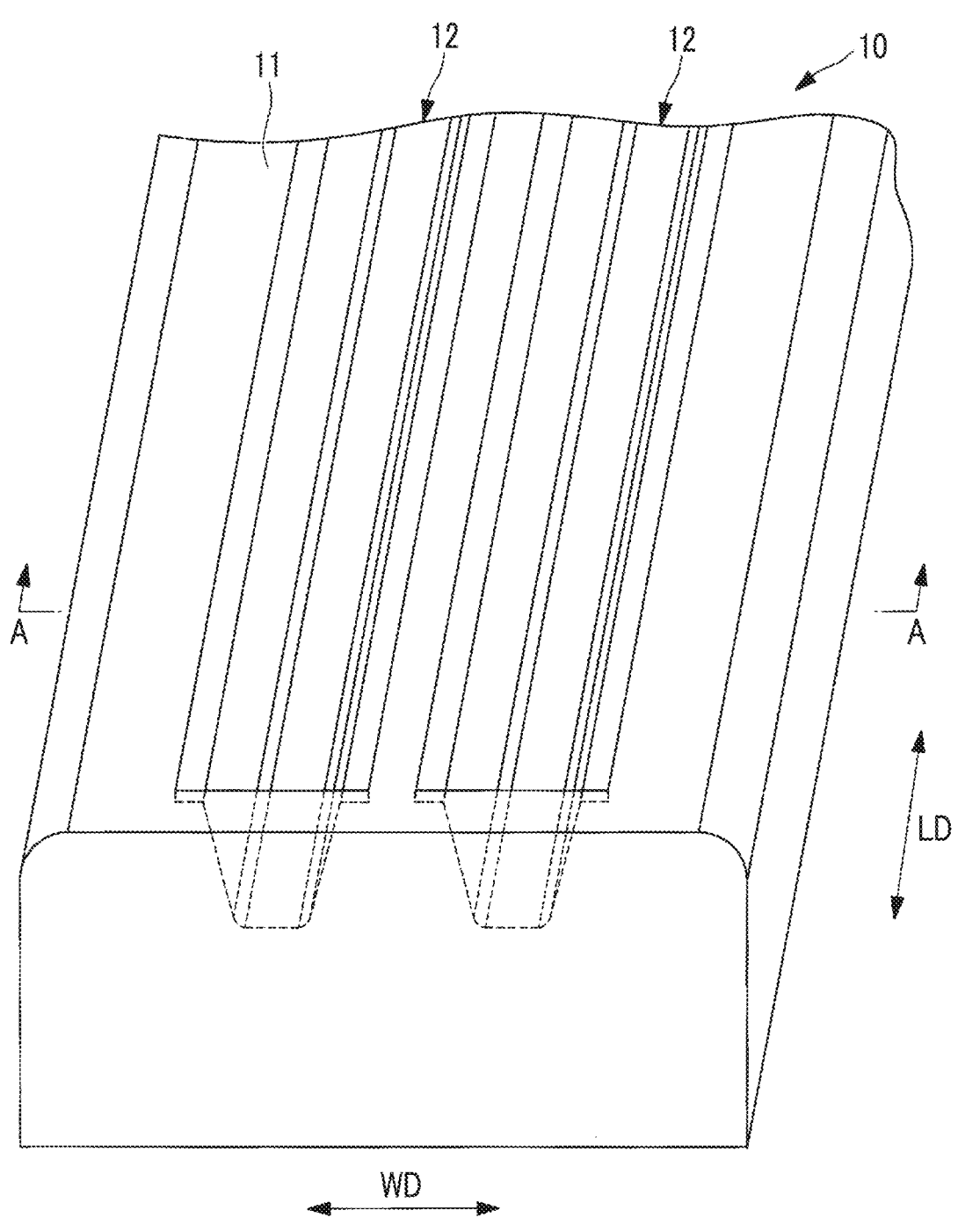
FIG. 2 is a perspective view showing a molding tool used in the composite material molding method according to the first embodiment of the present disclosure.
Figure 3:
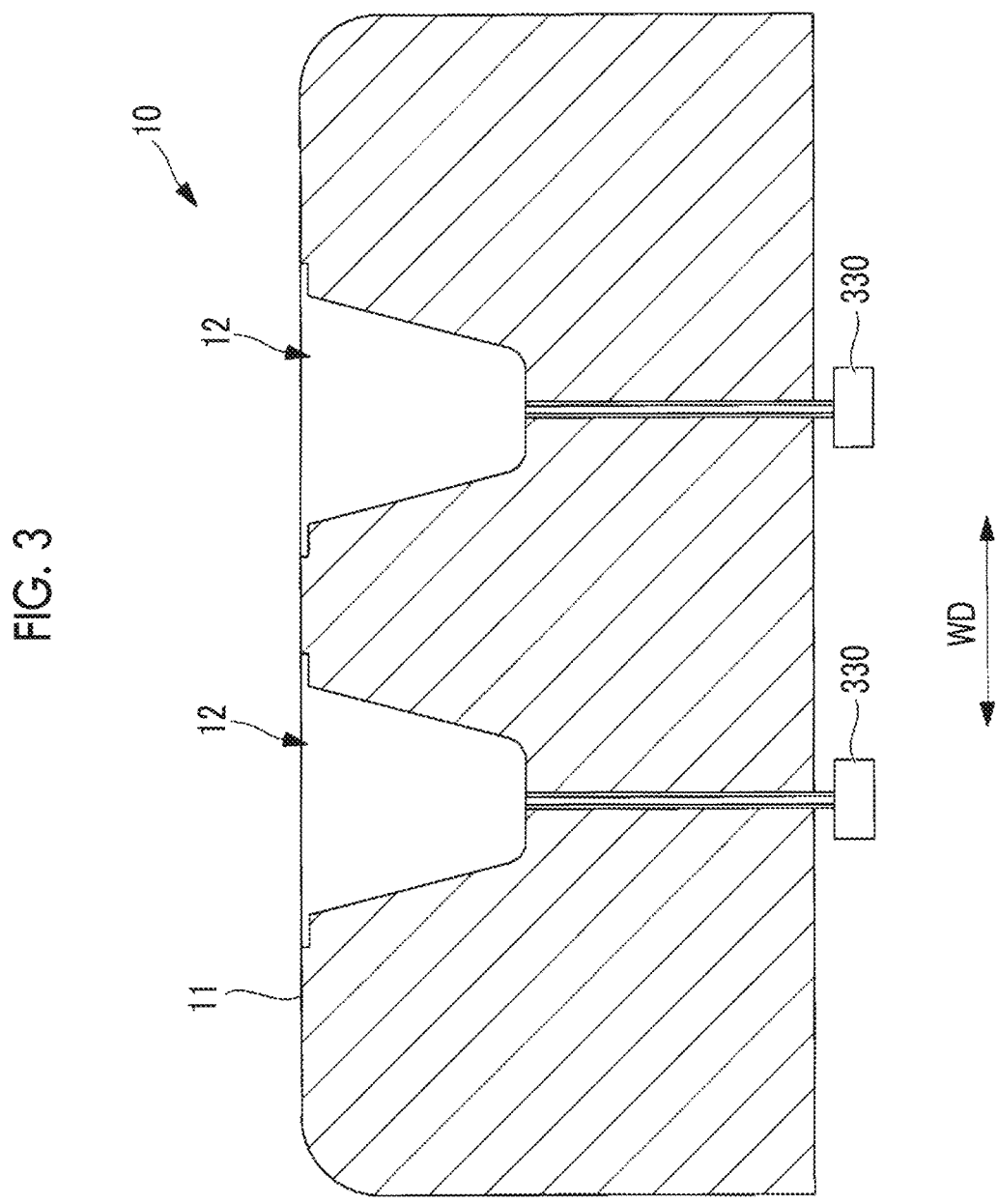
FIG. 3 is a cross-sectional view taken along line A-A of the molding tool shown in FIG. 2.

Hereinafter, a composite material molding method according to a first embodiment of the present disclosure will be described with reference to the drawings. FIG. 1 is a perspective view showing a composite material 300 molded by the composite material molding method according to the present embodiment. FIG. 2 is a perspective view showing a molding tool 10 used in the composite material molding method according to the present embodiment. FIG. 3 is a cross-sectional view taken along line A-A of the molding tool 10 shown in FIG. 2.

The composite material molding method of the present embodiment molds the composite material 300 shown in FIG. 1 as an example. The composite material 300 shown in FIG. 1 is a skin panel in which a skin and a stringer of an aircraft are integrally molded. The composite material 300 has a long shape extending along a longitudinal direction (first direction) LD.

The composite material 300 is molded by integrating a first fiber base material FB1 which is formed in a flat plate shape along the longitudinal direction LD and a width direction WD and a pair of second fiber base materials FB2 using a resin material. The second fiber base material FB2 is a member that extends along the longitudinal direction LD and of which a central portion in the width direction WD protrudes. The second fiber base material FB2 includes a hollow portion HP extending along the longitudinal direction LD. The width direction (second direction) WD is a direction orthogonal to the longitudinal direction LD on a surface on which the composite material 300 is installed.

As shown in FIG. 2, the molding tool 10 of the present embodiment is a molding tool of an inner mold line. The molding tool 10 includes a first molding surface 11 extending along the longitudinal direction LD. A recess 12 extending along the longitudinal direction LD and having a shape corresponding to the second fiber base material FB2 is formed on the first molding surface 11.

In the composite material molding method of the present embodiment, the second fiber base material FB2 is installed in the recess 12, the first fiber base material FB1 is laid up so as to cover the recess 12, and the first fiber base material FB1 is sealed with a bagging film 30 (see FIG. 9) to form a closed space CS. Then, infusion molding is performed in which the closed space CS is filled with a resin material RM (see FIG. 9) by depressurizing the closed space CS and the resin material RM is cured. The infusion molding is a method of resin transfer molding (RTM) in which a fiber base material is impregnated with a resin by utilizing a differential pressure between a vacuum pressure and an atmospheric pressure.

The first fiber base material FB1 and the second fiber base material FB2 are, for example, members in which sheets formed of reinforcing fiber materials such as carbon fibers and glass fibers are laid up over a plurality of layers. The resin material RM is, for example, a thermosetting resin material such as an epoxy resin, an unsaturated polyester, a vinyl ester, a phenol, a cyanate ester, and a polyimide.

In the following description, the resin material RM is a thermosetting resin material, but for example, a thermoplastic resin may be used. Examples of the thermoplastic resin include polyetheretherketone (PEEK), polyethylene terephthalate (PET), polybutylene terephthalate (PBT), nylon 6 (PA6), nylon 66 (PA66), polyphenylene sulfide (PPS), polyetherimide (PEI) and polyetherketoneketone (PEKK).

Figure 4:
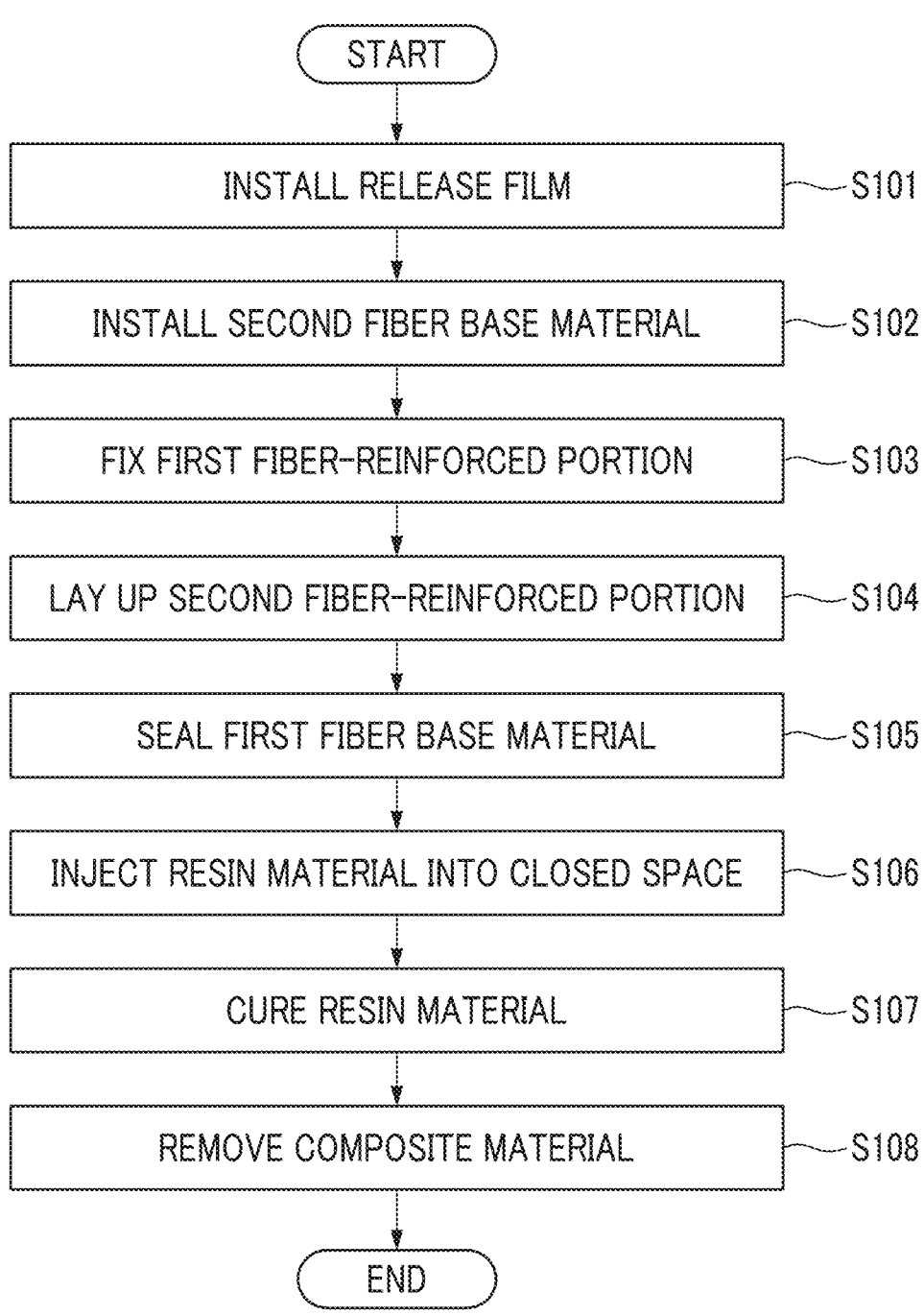
FIG. 4 is a flowchart showing the composite material molding method according to the first embodiment of the present disclosure.

Next, the composite material molding method according to the present embodiment will be described with reference to the drawings. FIG. 4 is a flowchart showing the composite material molding method according to the present embodiment.

Figure 5:
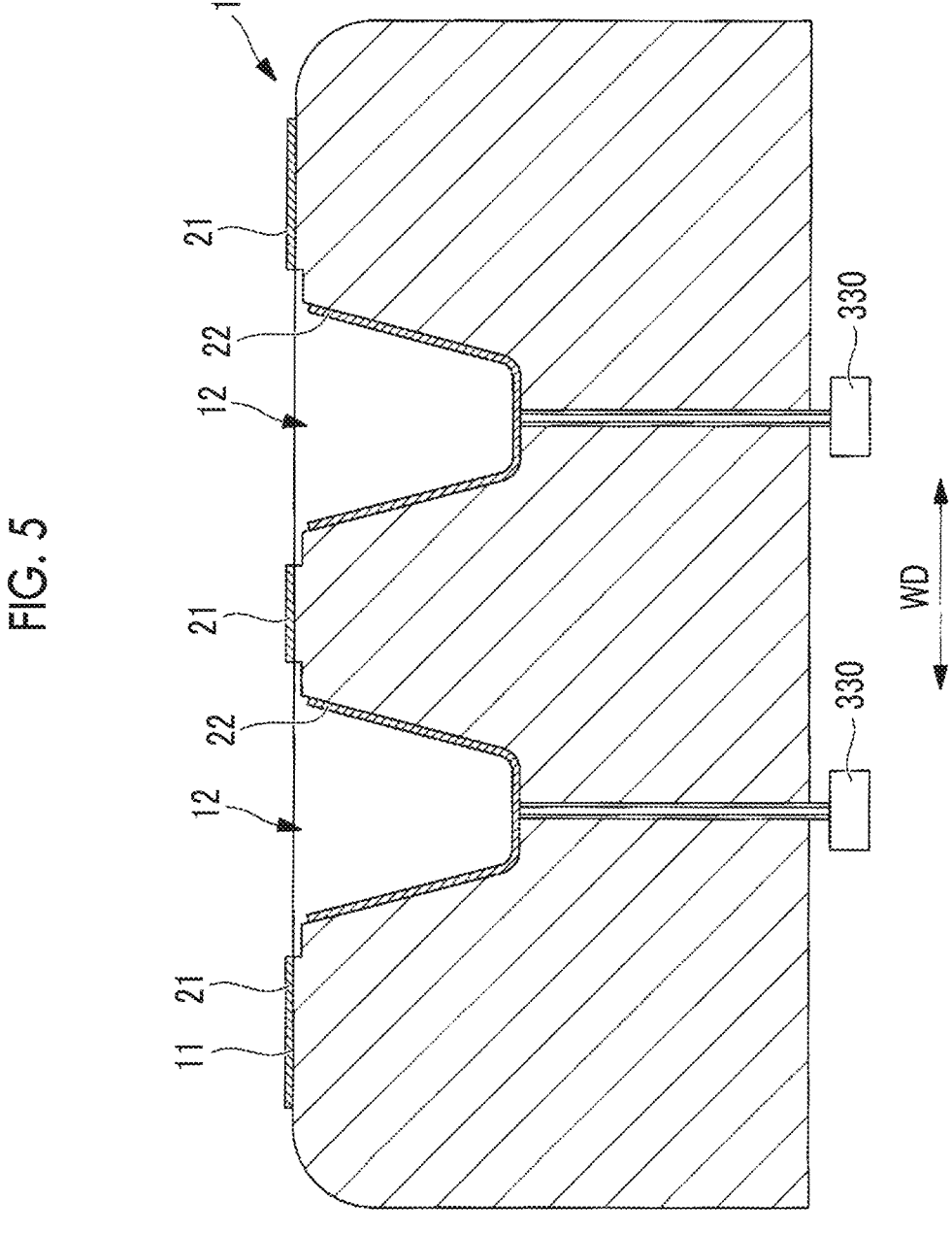
FIG. 5 is a cross-sectional view showing a state in which a release film is installed in the molding tool shown in FIG. 2.

In step S101, a release film 21 is attached to the first molding surface 11 of the molding tool 10, and a release film 22 is attached to the recess 12 of the molding tool 10. The release films 21 and 22 are attached to the molding tool 10 by, for example, melting a powdery thermoplastic resin. If the release films 21 and 22 are attached to the molding tool 10, a state shown in FIG. 5 is obtained. FIG. 5 is a cross-sectional view showing a state in which the release films 21 and 22 are installed in the molding tool 10 shown in FIG. 2.

The release films 21 and 22 are formed of a resin material having releasability with respect to the molding tool 10, the first fiber base material FB1, and the second fiber base material FB2. By installing the release films 21 and 22 in the molding tool 10, the composite material 300 after molding can be easily removed from the molding tool 10.

Figure 6:
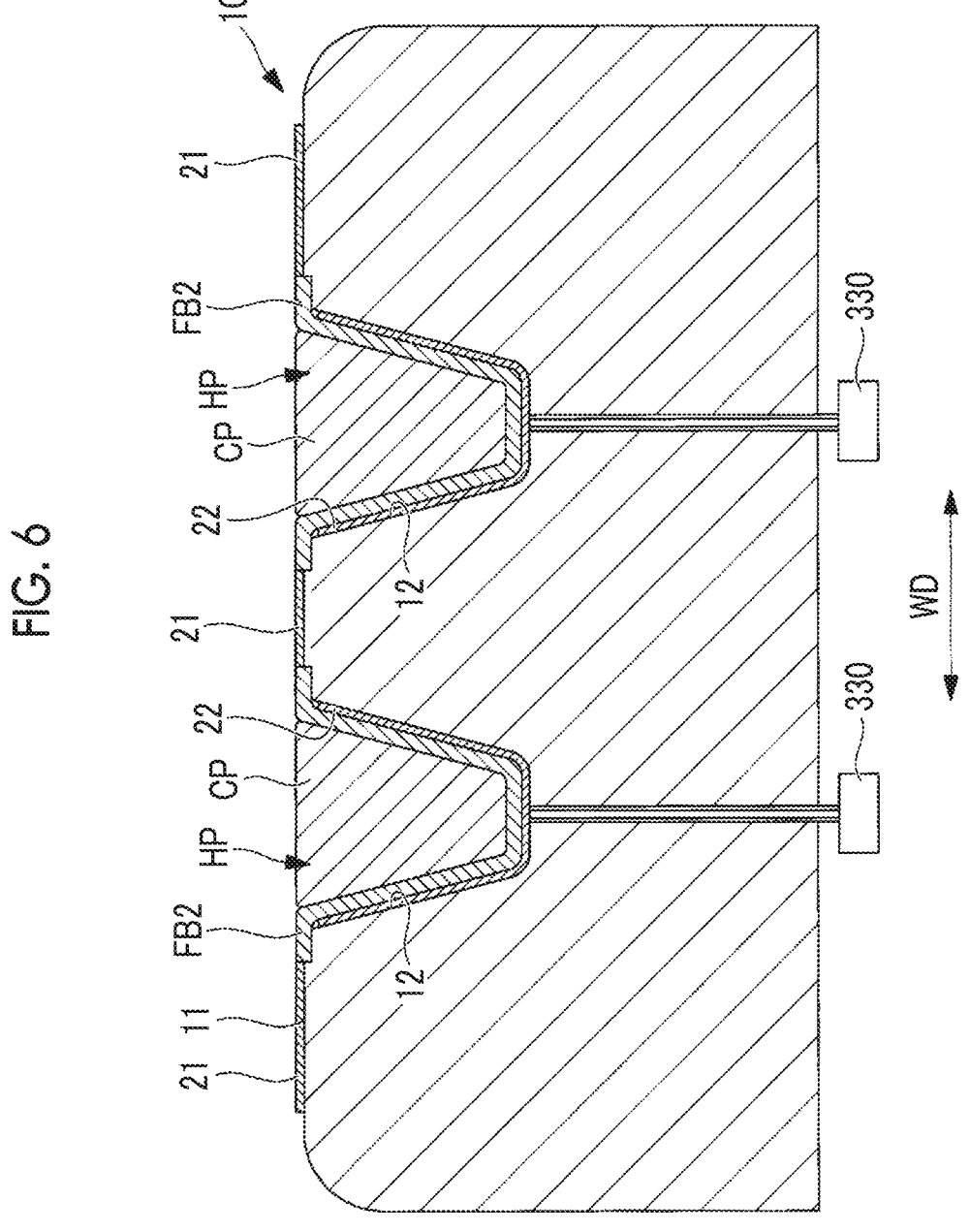
FIG. 6 is a cross-sectional view showing a state in which a second fiber base material is installed in a recess of the molding tool shown in FIG. 5.

In step S102 (installation step), in the recess 12 formed on the first molding surface 11 of the molding tool 10, the second fiber base material FB2 formed in a shape corresponding to the recess 12 is installed. If the second fiber base material FB2 is installed in the recess 12, a state shown in FIG. 6 is obtained. FIG. 6 is a cross-sectional view showing a state in which the second fiber base material FB2 is installed in the recess 12 of the molding tool 10 shown in FIG. 5.

As shown in FIG. 6, a core portion CP is inserted into the hollow portion HP of the second fiber base material FB2. The core portion CP is a member that is disposed in a state of being in contact with the second fiber base material FB2 without providing a gap. The core portion CP is a member having a shape corresponding to the hollow portion HP and formed in a long shape along the longitudinal direction LD. The core portion CP is formed of a member having a hardness capable of maintaining a constant shape even when a space in which the second fiber base material FB2 is disposed is in a vacuum state.

In FIG. 6, the core portion CP is inserted into the hollow portion HP of the second fiber base material FB2, but other aspects may be used. For example, a bladder (not shown), which is a bag that can be pressurized at a predetermined pressure such as an atmospheric pressure, may be disposed in the hollow portion HP, and the bladder may maintain a constant shape even when a space in which the second fiber base material FB2 is disposed is in a vacuum state by pressurizing the bladder.

Figure 7:
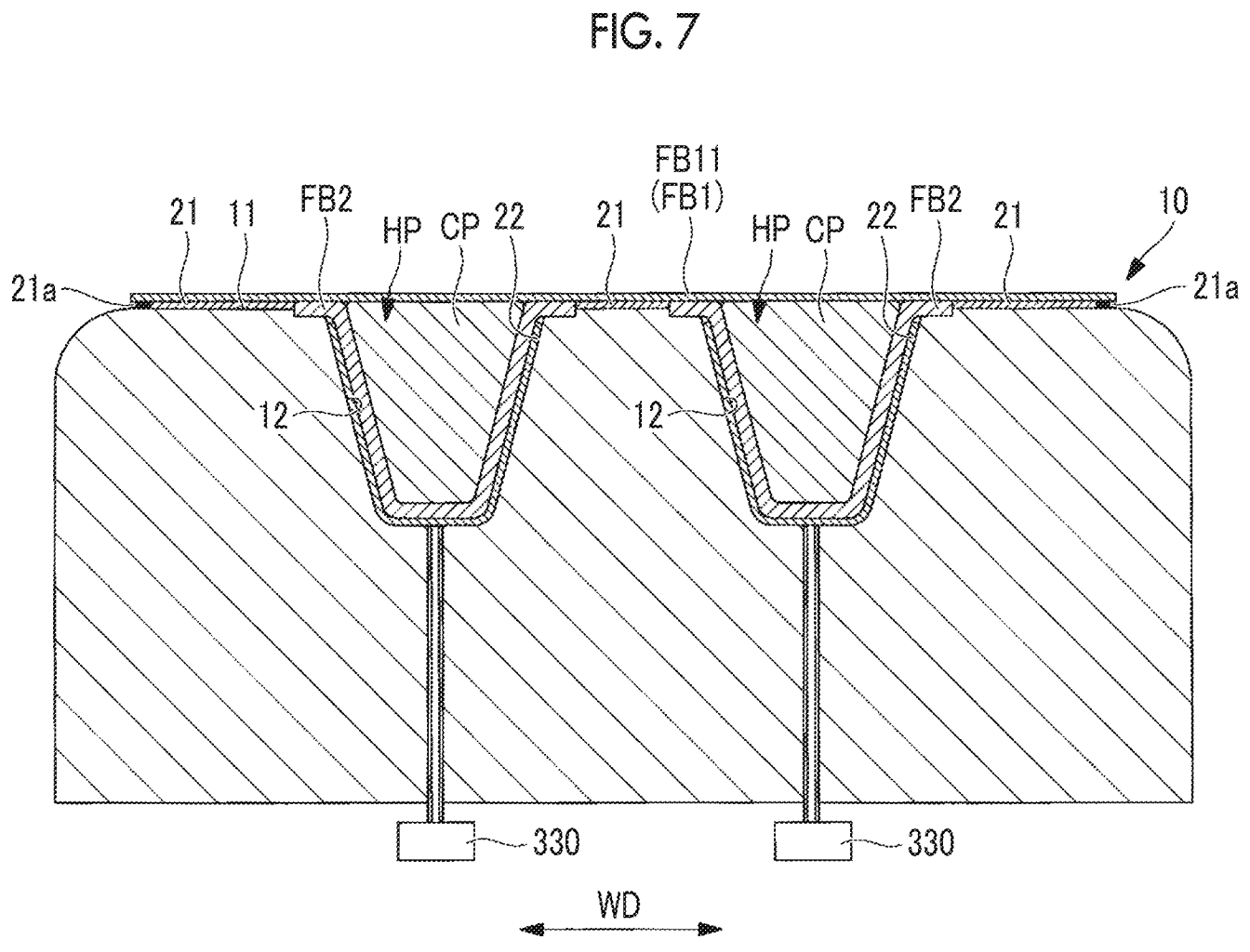

In step S103 (fixing step), a first fiber-reinforced portion FB 11 that is a part of a plurality of fiber reinforced sheets included in the first fiber base material FB1 is fixed to the first molding surface 11 so as to cover the recess 12 in which the second fiber base material FB2 is installed. In the fixing step, the first fiber-reinforced portion FB 11 is fixed to the first molding surface 11 in a state in which the release films (sheet materials) 21 and 22 are sandwiched between the first fiber-reinforced portion FB 11 and the first molding surface 11. If the first fiber-reinforced portion FB 11 is fixed to the first molding surface 11, a state shown in FIG. 7 is obtained. FIG. 7 is a cross-sectional view showing a state in which the first fiber-reinforced portion FB 11 is fixed to the molding tool 10 shown in FIG. 6.

The first fiber-reinforced portion FB11 is a part of a plurality of layers of the fiber reinforced sheets included in the first fiber base material FB1 and is configured to have a smaller number of layers than fiber reinforced sheets included in a second fiber-reinforced portion FB12 which will be described later.

The number of layers of the fiber reinforced sheets included in the first fiber base material FB1 is preferably one or more and five or less. The first fiber-reinforced portion FB11 is more flexible and lighter than the first fiber base material FB1. In addition, the first fiber-reinforced portion FB11 is more flexible and lighter than the second fiber-reinforced portion FB12.

The first fiber-reinforced portion FB 11 is fixed to the first molding surface 11 by an adhesive 21a. As the adhesive 21a, for example, the same material as the resin material RM can be used. An adhesive tape may be used instead of the adhesive 21a. In addition, the first fiber-reinforced portion FB 11 may be fixed to the first molding surface 11 by applying an adhesive material (for example, thermoplastic resin powder) to the first fiber-reinforced portion FB 11.

Figure 8:
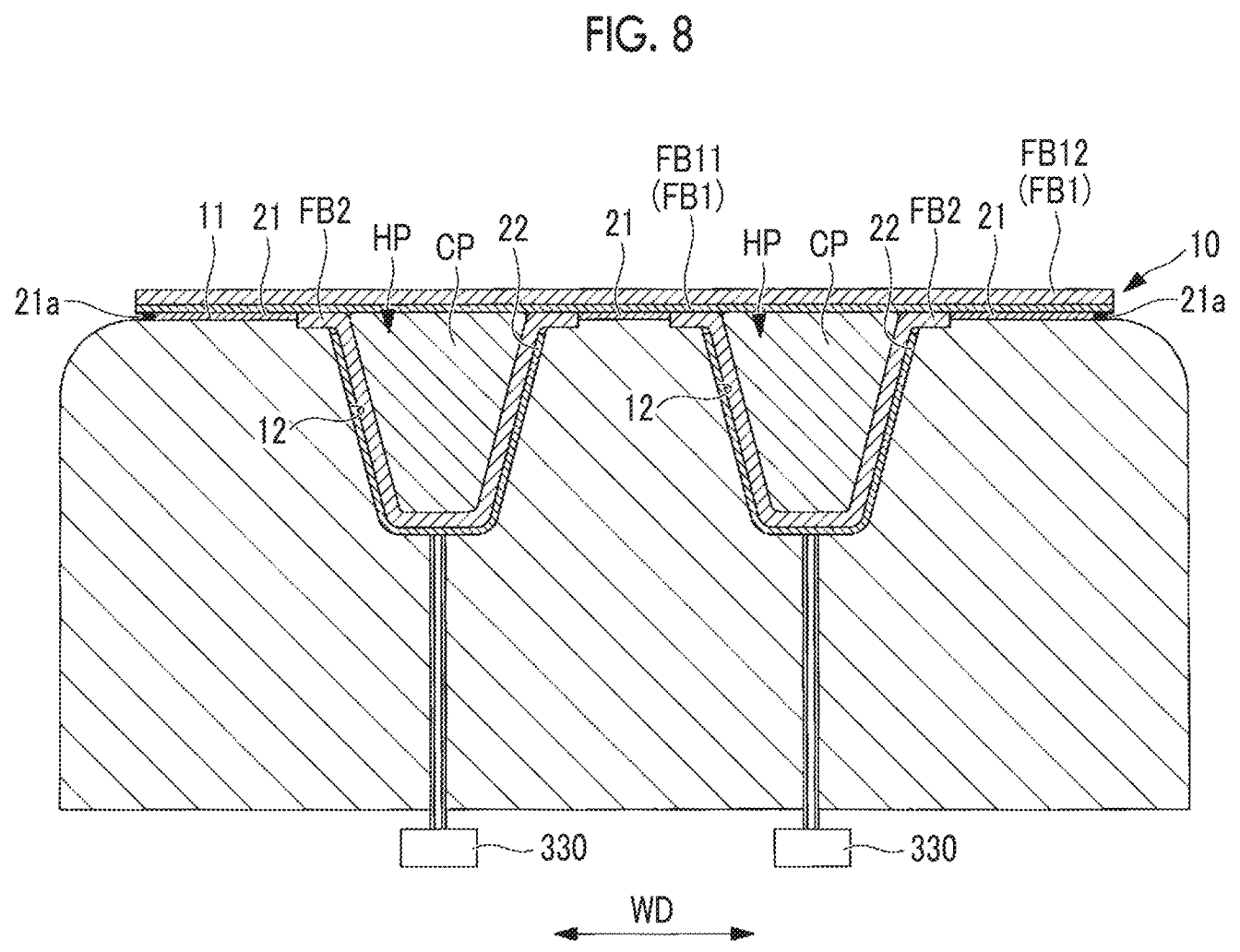

In step S104 (lay-up step), a second fiber-reinforced portion FB12 which is the other part of the plurality of fiber reinforced sheets included in the first fiber base material FB1 is laid up on the first fiber-reinforced portion FB11 fixed to the first molding surface 11. If the second fiber-reinforced portion FB12 is laid up on the first fiber-reinforced portion FB11, a state shown in FIG. 8 is obtained. FIG. 8 is a cross-sectional view showing a state in which the second fiber-reinforced portion is laid up on the first fiber-reinforced portion shown in FIG. 7.

The second fiber-reinforced portion FB12 is a part of the plurality of layers of the fiber reinforced sheets included in the first fiber base material FB1 and is configured to have a larger number of layers than the fiber reinforced sheets included in the first fiber-reinforced portion FB11. The second fiber-reinforced portion FB12 has a higher hardness and a heavier weight than the first fiber-reinforced portion FB11. The second fiber-reinforced portion FB12 is laid up on the first fiber-reinforced portion FB11 fixed to the first molding surface 11. Therefore, the second fiber base material FB2 does not move by the second fiber-reinforced portion FB12, and wrinkles do not occur in the second fiber base material FB2.

Figure 9:
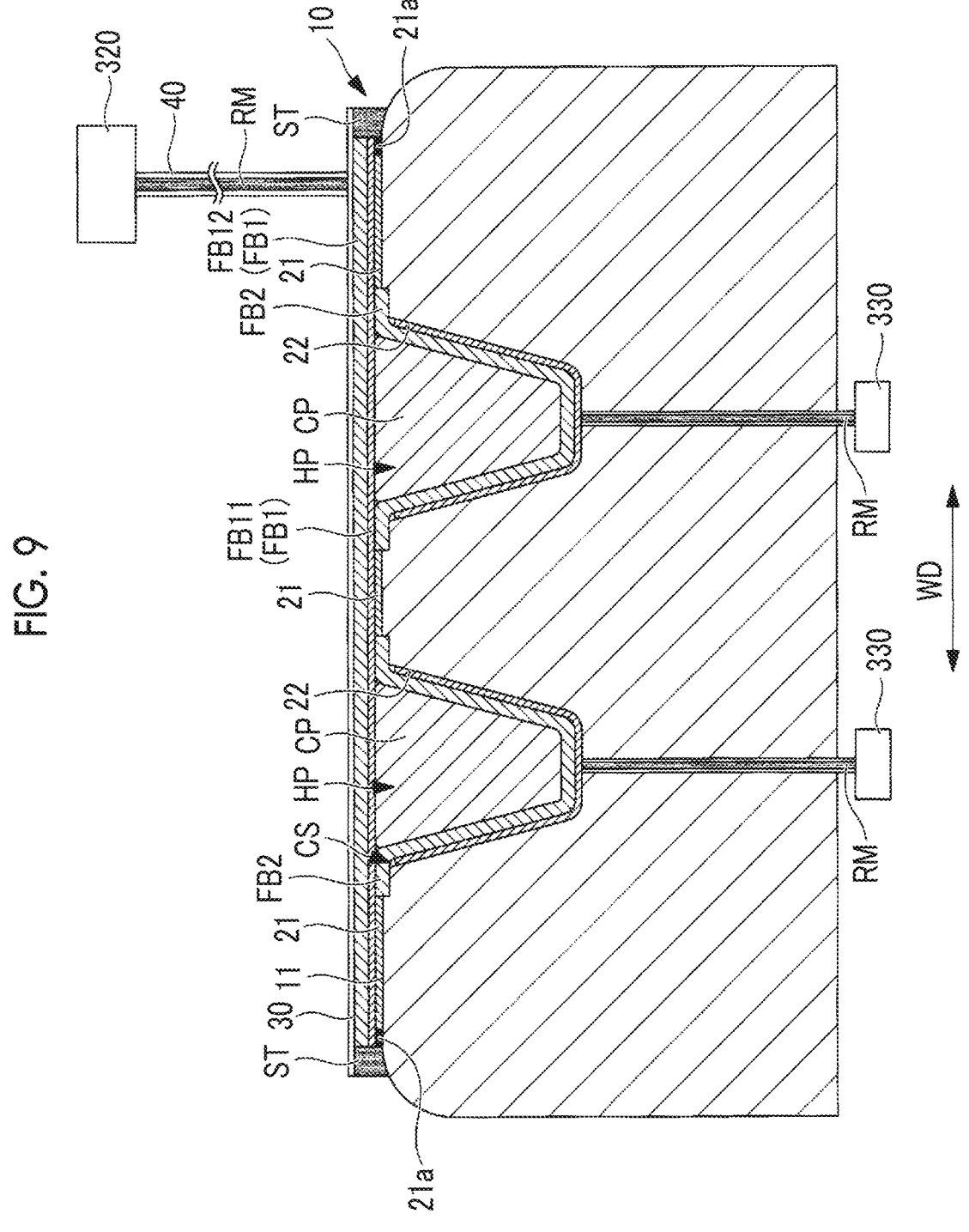
FIG. 9 is a cross-sectional view showing a state in which a first fiber base material shown in FIG. 8 is sealed with a bagging film.

In step S105 (sealing step), the first fiber base material FB1 is sealed in the molding tool 10 to form the closed space CS. Specifically, the bagging film 30 is bonded to the molding tool 10 with a sealant tape ST so as to cover an entire periphery of the molding tool 10, and the closed space CS is formed. If the sealing step of step S105 is completed, a state shown in FIG. 9 is obtained. FIG. 9 is a cross-sectional view showing a state in which the first fiber base material FB1 shown in FIG. 8 is sealed with the bagging film 30.

In step S105 (sealing step), if the closed space CS is formed, a state in which a resin injection line 50 connected to a supply source 330 of the resin material RM and the closed space CS communicate with each other is obtained. Further, if the closed space CS is formed, a state in which a suction line 40 connected to a suction source 320 and the closed space CS communicate with each other is obtained.

In step S106 (injection step), air in the closed space CS formed in step S105 (sealing step) is sucked to depressurize the closed space CS, and the resin material RM is injected into the first fiber base material FB1 and the second fiber base material FB2 sealed in the closed space CS. Specifically, the suction source 320 is operated to discharge the air existing in the closed space CS from the closed space CS via the suction line 40 and to reduce a pressure in the closed space CS to a vacuum state or a pressure close to the vacuum state lower than an atmospheric pressure.

Thereafter, the supply source 330 is brought into a state in which the resin material RM can be supplied to the resin injection line 50, and the resin material RM is injected into the closed space CS by a pressure difference between the resin injection line 50 and the depressurized closed space CS. The resin material RM diffuses into an entirety of the first fiber base material FB1 and the second fiber base material FB2. As a result, a state in which the first fiber base material FB1 and the second fiber base material FB2 are impregnated with the resin material RM is obtained. A part of the resin material RM with which the first fiber base material FB1 and the second fiber base material FB2 are impregnated is discharged to the suction line 40 as the surplus resin material RM.

In step S107 (curing step; molding step), the thermosetting resin material RM injected into the first fiber base material FB1 and the second fiber base material FB2 in step S106 (injection step) is heated to a temperature equal to or higher than a thermosetting temperature by a heating section (not shown) and the resin material RM is cured. In the curing step, the first fiber base material FB1 and the second fiber base material FB2 installed in the recess 12 are integrated and cured by the resin material RM to mold the composite material 300.

When the thermoplastic resin material RM is used, heating by the heating section is not performed in step S107 (curing step). In step S107, the resin material RM is cooled such that the resin material RM has a temperature sufficiently lower than a softening temperature.

In step S108 (removal step), the composite material 300 including the resin material RM, the first fiber base material FB1, and the second fiber base material FB2 cured in step S107 (curing step) is removed from the molding tool 10. Specifically, the sealant tape ST that bonds the bagging film 30 and the molding tool 10 is removed, and the bagging film 30 is removed from the molding tool 10.

The composite material 300 in a state in which the core portion CP is inserted into the hollow portion HP is removed from the molding tool 10 from which the bagging film 30 has been removed. Through the above steps, molding of the composite material 300 molded by the molding tool 10 is completed.

The operation and effect of the composite material molding method of the present embodiment described above will be described.

According to the composite material molding method of the present embodiment, the second fiber base material FB2 is installed in the recess 12 formed on the first molding surface 11 of the molding tool 10, and the first fiber-reinforced portion FB 11 is fixed to the first molding surface 11 so as to cover the recess 12 in which the second fiber base material FB2 is installed. Since the first fiber-reinforced portion FB11 is a part of the plurality of fiber reinforced sheets included in the first fiber base material FB1, the first fiber-reinforced portion FB11 is more flexible and lighter than the first fiber base material FB1. Therefore, the first fiber-reinforced portion FB 11 can be fixed to the first molding surface 11 without causing positional deviation and occurrence of wrinkles in the second fiber base material FB 2.

In addition, according to the composite material molding method of the present embodiment, after the first fiber-reinforced portion FB 11 is fixed to the first molding surface 11, the second fiber base material FB 2 does not come into contact with other members. Therefore, in the lay-up step, when the second fiber-reinforced portion FB12 is laid up on the first fiber-reinforced portion FB11, even if the second fiber-reinforced portion FB12 comes into contact with the first fiber-reinforced portion FB11, it is possible to prevent positional deviation of the second fiber base material FB2 and occurrence of wrinkles in the second fiber base material FB2.

According to the composite material molding method of the present embodiment, for example, even if a sheet material such as a release film is sandwiched between the first molding surface 11 and the first fiber-reinforced portion FB11, the sheet material does not come into contact with other members after the first fiber-reinforced portion FB11 is fixed to the first molding surface 11. Therefore, in the lay-up step, when the second fiber-reinforced portion FB12 is laid up on the first fiber-reinforced portion FB11, the sheet material is prevented from being moved and sandwiched between the first fiber base material FB1 and the second fiber base material FB2.

Second Embodiment

Next, a composite material molding method according to a second embodiment of the present disclosure will be described with reference to the drawings. The present embodiment is a modification example of the first embodiment and is assumed to be the same as the first embodiment except for a case particularly described below, and the same description will be omitted below.

In the composite material molding method of the first embodiment, the first fiber-reinforced portion FB 11 is fixed to the first molding surface 11 formed in a flat shape, and the second fiber-reinforced portion FB 12 formed in a flat shape is laid up on the first fiber-reinforced portion FB 11.

On the other hand, in the composite material molding method of the present embodiment, the first fiber-reinforced portion FB 11 is fixed to a curved portion 14 of the molding tool 10, and the second fiber-reinforced portion FB12 shaped into a shape corresponding to the curved portion 14 by a forming die 20 is laid up on the first fiber-reinforced portion FB11.

Figure 10:
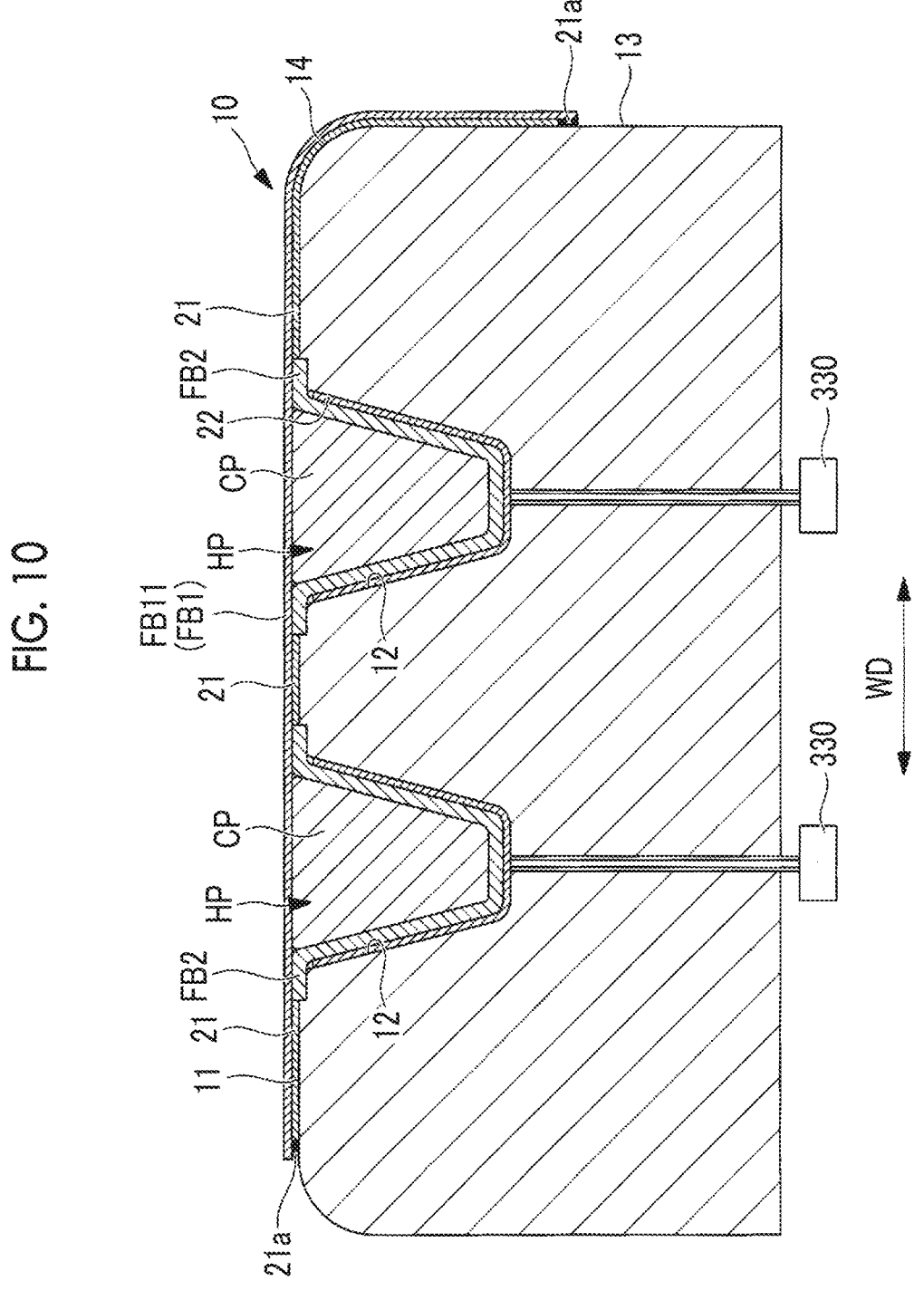
FIG. 10 is a cross-sectional view showing a state in which the first fiber-reinforced portion is fixed to a molding tool used in a composite material molding method of a second embodiment of the present disclosure.

FIG. 10 is a cross-sectional view showing a state in which the first fiber-reinforced portion FB 11 is fixed to the molding tool 10 used in the composite material molding method of the present embodiment. As shown in FIG. 10, the molding tool 10 includes the curved portion 14 provided at an end portion of the first molding surface 11 in the width direction WD orthogonal to the longitudinal direction LD. In the present embodiment, in the fixing step of step S103 of FIG. 4, the first fiber-reinforced portion FB 11 is fixed to the first molding surface 11 and a second molding surface 13. The second molding surface 13 is a flat surface connected to the first molding surface 11 via the curved portion 14.

In addition, the composite material molding method of the present embodiment further includes a shaping step of pre-shaping the second fiber-reinforced portion FB12 laid up on the first fiber-reinforced portion FB11 in step S104 of FIG. 4. The shaping step is a step of pre-shaping the second fiber-reinforced portion FB12 having a flat shape by using the forming die 20 shown in FIG. 11.

Figure 11:
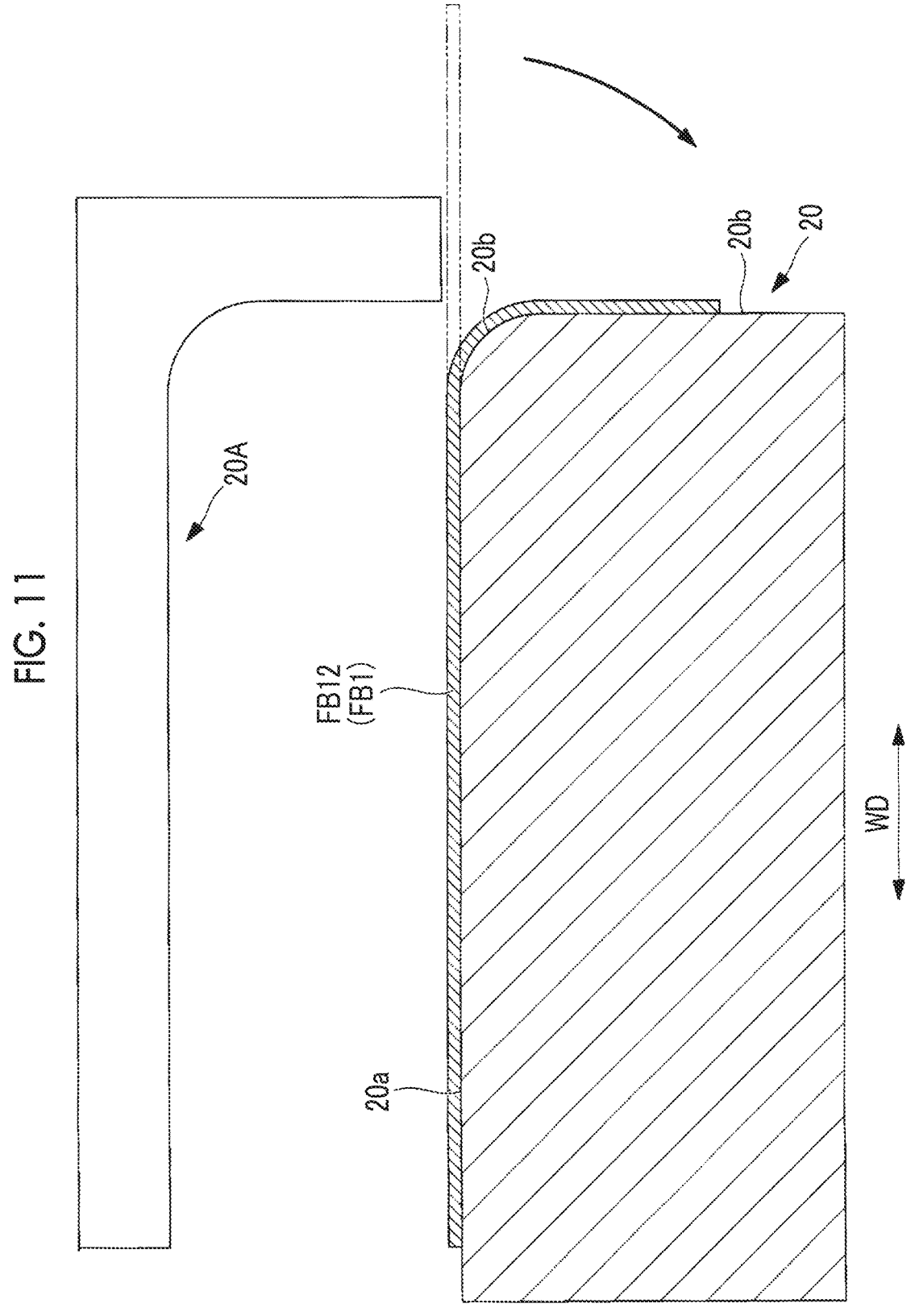
FIG. 11 is a cross-sectional view showing a state in which the second fiber-reinforced portion is shaped by the forming die.

As shown in FIG. 11, the forming die 20 has a flat first molding surface 20a, a curved portion 20b, and a second molding surface 20c. The first molding surface 20a, the curved portion 20b, and the second molding surface 20c have shapes corresponding to the first molding surface 11, the curved portion 14, and the second molding surface 13 of the molding tool 10, respectively. In the shaping step of the present embodiment, the second fiber-reinforced portion FB12 (a shape shown by a broken line in FIG. 11) formed in a flat shape is shaped into a shape corresponding to the curved portion 14 by using the forming die 20 having a shape corresponding to the curved portion 14.

As shown in FIG. 11, the second fiber-reinforced portion FB12 formed in a flat shape is shaped into a shape corresponding to the curved portion 14 by pressing the flat second fiber-reinforced portion FB12 having a flat shape against the forming die 20 by an upper die 20A.

Figure 12:
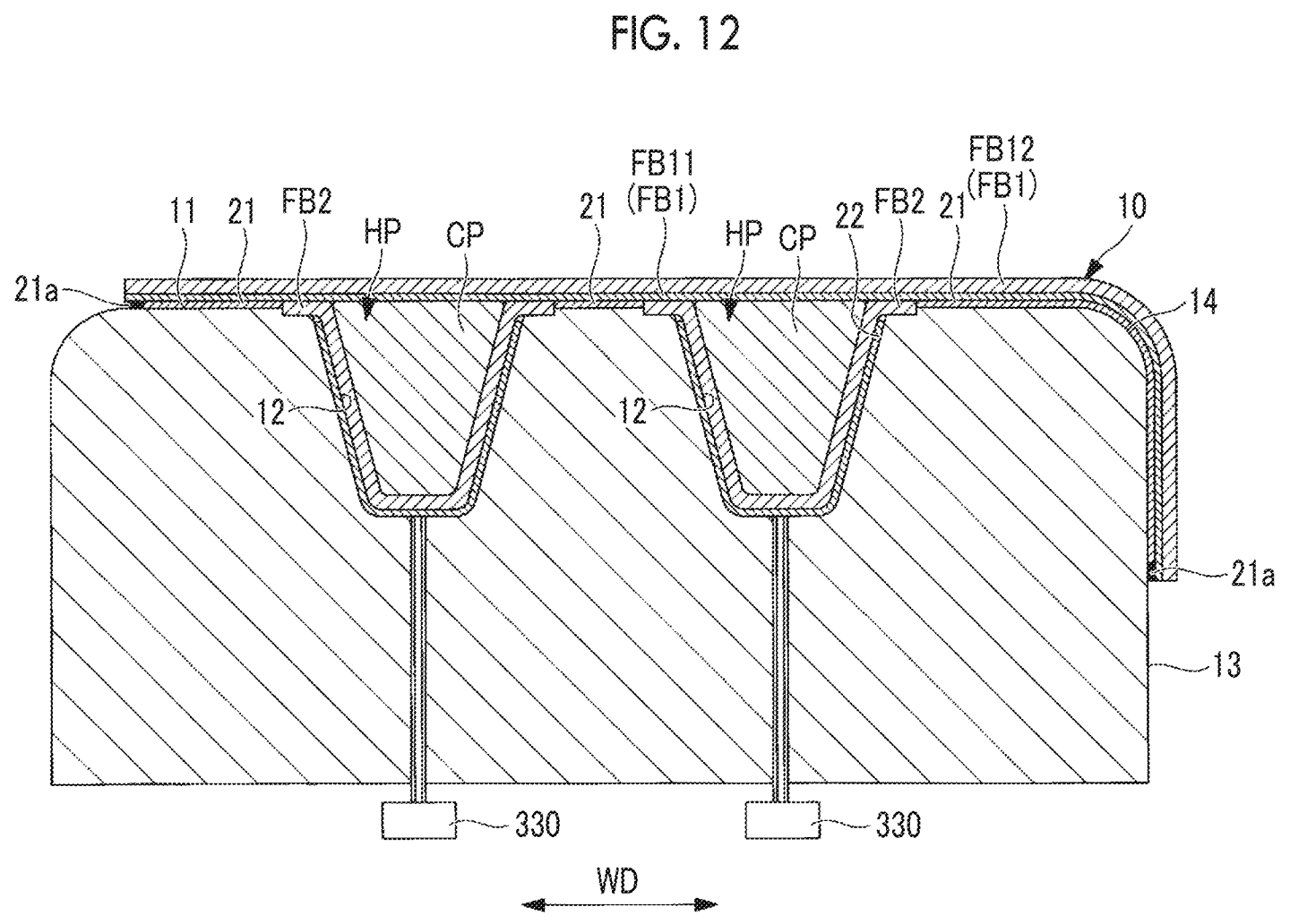

In addition, in the present embodiment, in the lay-up step of step S104 of FIG. 4, the second fiber-reinforced portion FB12 shaped into a shape corresponding to the curved portion 14 by the shaping step is laid up on the first fiber-reinforced portion FB11. If the second fiber-reinforced portion FB12 shaped into a shape corresponding to the curved portion 14 is laid up on the first fiber-reinforced portion FB11, a state shown in FIG. 12 is obtained. FIG. 12 is a cross-sectional view showing a state in which the second fiber-reinforced portion FB12 is laid up on the first fiber-reinforced portion FB11 shown in FIG. 10.

According to the composite material molding method of the present embodiment, the second fiber-reinforced portion FB12 formed in a flat shape is shaped into a shape corresponding to the curved portion 14 of the molding tool 10 by using the forming die 20. Therefore, the second fiber-reinforced portion FB12 shaped in advance into a shape corresponding to the curved portion 14 by the forming die 20 can be laid up on the first fiber-reinforced portion FB11 to obtain the first fiber base material FB1.

Third Embodiment

Next, a composite material molding method according to a third embodiment of the present disclosure will be described with reference to the drawings. The present embodiment is a modification example of the first embodiment and is assumed to be the same as the first embodiment except for a case particularly described below, and the same description will be omitted below.

In the composite material molding method of the first embodiment, the first fiber-reinforced portion FB 11 is fixed to the first molding surface 11 formed in a flat shape, and the second fiber-reinforced portion FB 12 formed in a flat shape is laid up on the first fiber-reinforced portion FB 11.

On the other hand, in the composite material molding method of the present embodiment, the first fiber-reinforced portion FB 11 is fixed to the curved portion 14 of the molding tool 10, and an end portion in the width direction WD of the second fiber-reinforced portion FB 12 formed in a flat shape is pressed against the curved portion 14 of the molding tool 10 to shape the second fiber-reinforced portion.

Figure 13:
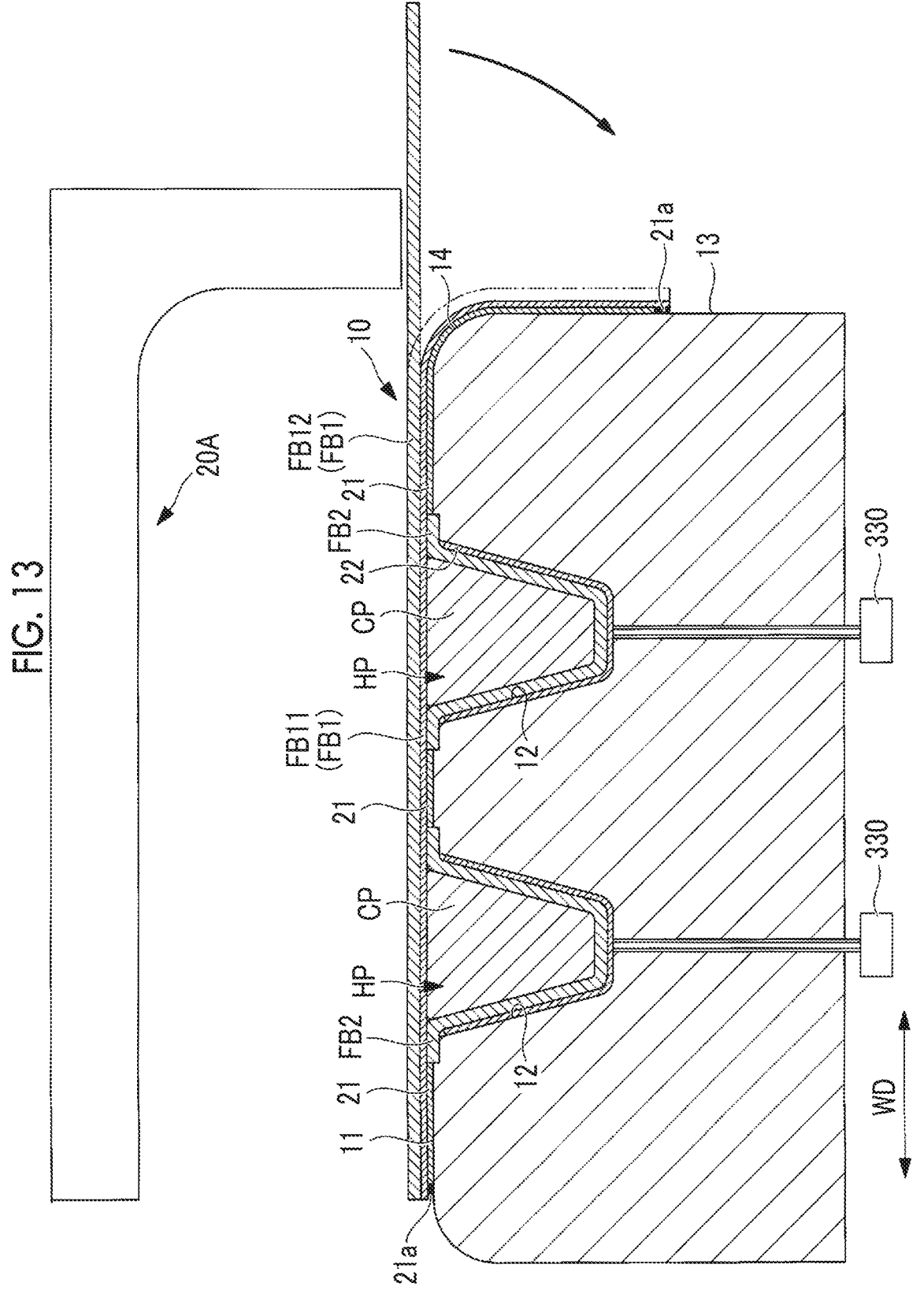
FIG. 13 is a cross-sectional view showing a state before shaping the second fiber-reinforced portion in a molding tool used in a composite material molding method of the third embodiment of the present disclosure.

FIG. 13 is a cross-sectional view showing a state before shaping the second fiber-reinforced portion FB12 in the molding tool 10 used in the composite material molding method of the present embodiment. As shown in FIG. 13, the molding tool 10 includes the curved portion 14 provided at an end portion of the first molding surface 11 in the width direction WD orthogonal to the longitudinal direction LD. In the present embodiment, in the fixing step of step S103 of FIG. 4, the first fiber-reinforced portion FB 11 is fixed to the first molding surface 11 and a second molding surface 13. The second molding surface 13 is a flat surface connected to the first molding surface 11 via the curved portion 14.

In addition, the composite material molding method of the present embodiment further includes a shaping step of shaping the second fiber-reinforced portion FB12 laid up on the first fiber-reinforced portion FB11 in step S104 of FIG. 4. The shaping step is a step of shaping the flat second fiber-reinforced portion FB12 having a flat shape by using the molding tool 10 shown in FIG. 13.

As shown in FIG. 13, in the shaping step of the present embodiment, the second fiber-reinforced portion FB12 formed in a flat shape is shaped into a shape corresponding to the curved portion 14 by using the forming die 20 having a shape corresponding to the curved portion 14 so that the second fiber-reinforced portion FB12 has a shape shown by a broken line in FIG. 13.

As shown in FIG. 13, the second fiber-reinforced portion FB12 having a flat shape is pressed against the molding tool 10 by the upper die 20A so that the second fiber-reinforced portion FB12 formed in a flat shape is shaped into a shape corresponding to the curved portion 14. In the present embodiment, in the lay-up step of step S104 of FIG. 4, the second fiber-reinforced portion FB12 shaped into a shape corresponding to the curved portion 14 by the shaping step is laid up on the first fiber-reinforced portion FB11.

According to the composite material molding method of the present embodiment, the second fiber-reinforced portion FB12 formed in a flat shape is pressed against the curved portion 14 of the molding tool 10 so that the end portion of the second fiber-reinforced portion FB12 in the width direction WD is shaped into a shape corresponding to the curved portion 14. Therefore, the second fiber-reinforced portion FB12 can be shaped without using another mold different from the molding tool 10, and the shaped second fiber-reinforced portion FB12 can be laid up on the first fiber-reinforced portion FB11 to obtain the first fiber base material FB1.

The composite material molding method described in the embodiments described above is grasped as follows, for example.

The composite material molding method according to the present disclosure is a composite material molding method for molding a composite material (300) by integrating a first fiber base material (FB1) which is formed in a plate shape and a second fiber base material (FB2), the method including: an installation step (S102) of installing, in a recess (12) formed in a first molding surface (11) of a molding tool (10) having the first molding surface extending along a first direction (LD), the second fiber base material formed in a shape corresponding to the recess; a fixing step (S103) of fixing a first fiber-reinforced portion (FB11) which is a part of a plurality of fiber reinforced sheets included in the first fiber base material to the first molding surface to cover the recess in which the second fiber base material is installed by the installation step; a lay-up step (S104) of laying up a second fiber-reinforced portion (FB12), which is the other part of the plurality of fiber reinforced sheets included in the first fiber base material, on the first fiber-reinforced portion fixed by the fixing step; and a molding step (S106, S107) of molding the composite material by integrating and curing the first fiber base material and the second fiber base material installed in the recess using a resin material.

According to the composite material molding method of the present disclosure, the second fiber base material is installed in the recess formed on the first molding surface of the molding tool, and the first fiber-reinforced portion is fixed to the first molding surface so as to cover the recess in which the second fiber base material is installed. Since the first fiber-reinforced portion is a part of the plurality of fiber reinforced sheets included in the first fiber base material, the first fiber-reinforced portion is more flexible and lighter than the first fiber base material. Therefore, the first fiber-reinforced portion can be fixed to the first molding surface without causing positional deviation and occurrence of wrinkles in the second fiber base material.

In addition, according to the composite material molding method of the present disclosure, after the first fiber-reinforced portion is fixed to the first molding surface, the second fiber base material does not come into contact with other members. Therefore, in the lay-up step, when the second fiber-reinforced portion is laid up on the first fiber-reinforced portion, even if the second fiber-reinforced portion comes into contact with the first fiber-reinforced portion, it is possible to prevent positional deviation of the second fiber base material and occurrence of wrinkles in the second fiber base material.

In the composite material molding method according to the present disclosure, a configuration is preferable in which in the fixing step, the first fiber-reinforced portion is fixed to the first molding surface in a state in which the sheet materials (21, 22) are sandwiched between the first fiber-reinforced portion and the first molding surface.

According to the composite material molding method of the present configuration, for example, even if a sheet material such as a release film is sandwiched between the first molding surface and the first fiber-reinforced portion, the sheet material does not come into contact with other members after the first fiber-reinforced portion is fixed to the first molding surface. Therefore, in the lay-up step, when the second fiber-reinforced portion is laid up on the first fiber-reinforced portion, the sheet material is prevented from being moved and sandwiched between the first fiber base material and the second fiber base material.

In the composite material molding method according to the present disclosure, a configuration is preferable in which the molding tool includes a curved portion (14) having at least one of a convex shape and a concave shape provided at an end portion of the first molding surface in a second direction (WD) orthogonal to the first direction, the composite material molding method further includes a shaping step of shaping the second fiber-reinforced portion formed in a flat shape into a shape corresponding to the curved portion by using a forming die (20) having a shape corresponding to the curved portion, and in the lay-up step, the second fiber-reinforced portion shaped into a shape corresponding to the curved portion by the shaping step is laid up on the first fiber-reinforced portion.

According to the composite material molding method of the present configuration, the second fiber-reinforced portion formed in a flat shape is shaped into a shape corresponding to the curved portion of the molding tool by using the forming die. Therefore, the second fiber-reinforced portion shaped in advance into a shape corresponding to the curved portion by the forming die can be laid up on the first fiber-reinforced portion to obtain the first fiber base material.

In the composite material molding method according to the present disclosure, the molding tool includes a curved portion having at least one of a convex shape and a concave shape provided at an end portion of the first molding surface in a second direction orthogonal to the first direction, and the composite material molding method further includes a shaping step of pressing an end portion in the second direction of the second fiber-reinforced portion formed in a flat shape against the curved portion to shape the second fiber-reinforced portion.

According to the composite material molding method of the present configuration, the second fiber-reinforced portion formed in a flat shape is pressed against the curved portion of the molding tool so that the end portion of the second fiber-reinforced portion in the second direction is shaped into a shape corresponding to the curved portion. Therefore, the second fiber-reinforced portion can be shaped without using another mold different from the molding tool, and the shaped second fiber-reinforced portion can be laid up on the first fiber-reinforced portion to obtain the first fiber base material.

REFERENCE SIGNS LIST

10: Molding tool
11: First molding surface
12: Recess
13: Second molding surface
14: Curved portion
20: Forming die
20A: Upper die
20a: First molding surface
20b: Curved portion
20c: Second molding surface
21, 22: Release film (sheet material)
30: Bagging film
40: Suction line
50: Resin injection line
300: Composite material
320: Suction source
330: Supply source
CS: Closed space
FB1: First fiber base material
FB11: First fiber-reinforced portion
FB12: Second fiber-reinforced portion
FB2: Second fiber base material
HP: Hollow portion
LD: Longitudinal direction
RM: Resin material
ST: Sealant tape
WD: Width direction

The invention claimed is:

1. A composite material molding method for molding a composite material by integrating a first fiber base material which is formed in a plate shape and a second fiber base material, the method comprising:

an installation step of installing, in a recess formed in a first molding surface of a molding tool having the first molding surface extending along a longitudinal direction, the second fiber base material formed in a shape corresponding to the recess, a core portion or a bladder being inserted into a hollow portion of the second fiber base material;

a fixing step of fixing a pair of end portions of a first fiber-reinforced portion in a width direction orthogonal to the longitudinal direction to the first molding surface to cover the recess in which the second fiber base material and either the core portion or the bladder are installed by the installation step, the first fiber-reinforced portion being a part of a plurality of fiber reinforced sheets included in the first fiber base material, and a pair of end portions of the second fiber base material being included between the pair of end portions of the first fiber-reinforced portion in the width direction;

a lay-up step of laying up a second fiber-reinforced portion, which is the other part of the plurality of fiber reinforced sheets included in the first fiber base material, on the first fiber-reinforced portion fixed by the fixing step, the second fiber-reinforced portion having a larger number of layers than the fiber reinforced sheets included in the first fiber-reinforced portion, and the pair of end portions of the second fiber base material being included between the pair of end portions of the second fiber-reinforced portion in the width direction; and a molding step of molding the composite material by integrating and curing the first fiber base material and the second fiber base material installed in the recess using a resin material, wherein in the fixing step, the pair of end portions of the first fiber-reinforced portion is positioned on an outer side of the pair of end portions of the second fiber base material along the width direction to prevent the second fiber base material from contacting other members and moving in the lay-up step.

2. The composite material molding method according to claim 1, wherein in the fixing step, the first fiber-reinforced portion is fixed to the first molding surface in a state in which a sheet material is sandwiched between the first fiber-reinforced portion and the first molding surface.

3. The composite material molding method according to claim 2, wherein the molding tool includes a curved portion provided at an end portion of the first molding surface in the width direction, the composite material molding method further comprises a shaping step of shaping the second fiber-reinforced portion formed in a flat shape into a shape corresponding to the curved portion by using a forming die having a shape corresponding to the curved portion, and in the lay-up step, the second fiber-reinforced portion shaped into a shape corresponding to the curved portion by the shaping step is laid up on the first fiber-reinforced portion.

4. The composite material molding method according to claim 2, wherein the molding tool includes a curved portion provided at an end portion of the first molding surface in the width direction, and the composite material molding method further comprises a shaping step of pressing an end portion in the width direction of the second fiber-reinforced portion formed in a flat shape against the curved portion to shape the second fiber-reinforced portion.

5. The composite material molding method according to claim 1, wherein the molding tool includes a curved portion provided at an end portion of the first molding surface in the width direction, the composite material molding method further comprises a shaping step of shaping the second fiber-reinforced portion formed in a flat shape into a shape corresponding to the curved portion by using a forming die having a shape corresponding to the curved portion, and in the lay-up step, the second fiber-reinforced portion shaped into a shape corresponding to the curved portion by the shaping step is laid up on the first fiber-reinforced portion.

6. The composite material molding method according to claim 1, wherein the molding tool includes a curved portion provided at an end portion of the first molding surface in the width direction, and the composite material molding method further comprises a shaping step of pressing an end portion in the width direction of the second fiber-reinforced portion formed in a flat shape against the curved portion to shape the second fiber-reinforced portion.

7. The composite material molding method according to claim 1, wherein the first fiber-reinforced portion is fixed to the first molding surface formed in a flat shape in the fixing step, and the second fiber-reinforced portion formed in a flat shape is laid up on the first fiber-reinforced portion in the lay-up step.

* * * * *